United States Patent
Tsunashima et al.

(10) Patent No.: US 8,042,420 B2
(45) Date of Patent: Oct. 25, 2011

(54) TWIN CLUTCH TYPE SPEED-CHANGE APPARATUS

(75) Inventors: Kousuke Tsunashima, Saitama (JP);
Hiroyuki Kojima, Saitama (JP);
Yoshihisa Kanno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 532 days.

(21) Appl. No.: 12/336,133

(22) Filed: Dec. 16, 2008

(65) Prior Publication Data
US 2009/0165582 A1 Jul. 2, 2009

(30) Foreign Application Priority Data
Dec. 27, 2007 (JP) ................................. 2007-336426

(51) Int. Cl.
*F16H 59/00* (2006.01)
*G06F 7/00* (2006.01)

(52) U.S. Cl. ........................ 74/337.5; 74/336 R; 701/64
(58) Field of Classification Search .................... 74/335, 74/329, 330, 339, 336 R, 337.5; 477/34, 477/122, 123, 124; 701/64
See application file for complete search history.

(56) References Cited

U.S. PATENT DOCUMENTS

| 6,249,734 | B1 * | 6/2001 | Ota | 701/51 |
| 6,484,597 | B2 * | 11/2002 | Ota et al. | 74/335 |
| 7,568,403 | B2 * | 8/2009 | Matsuda et al. | 74/335 |
| 7,895,911 | B2 * | 3/2011 | Hiroi et al. | 74/335 |

FOREIGN PATENT DOCUMENTS

| EP | 1770306 A1 | 4/2007 |
| EP | 1826053 A1 | 8/2007 |
| EP | 1906056 A1 * | 4/2008 |
| EP | 1906056 A1 | 4/2008 |
| JP | 61-202744 U | 12/1986 |
| JP | 2003-322253 A | 11/2003 |
| JP | 2004-197791 A | 7/2004 |
| JP | 2009180342 A * | 8/2009 |
| WO | WO-2008/038724 A1 | 4/2008 |
| WO | WO-2008/038797 A1 | 4/2008 |

* cited by examiner

*Primary Examiner* — Roger Pang
(74) *Attorney, Agent, or Firm* — Birch, Stewart, Kolasch & Birch, LLP

(57) ABSTRACT

A twin clutch type speed-change apparatus for detecting the engagement state of a dog clutch by use of the rotational speed difference between an inner main shaft and an outer main shaft and of a signal outputted from a gear position sensor. A rotational speed difference between an inner main shaft and an outer main shaft is detected by use of inner and outer rotational speed sensors. When the engagement of the dog clutch is to be released, it is judged to complete the release if the signal outputted from the gear position sensor indicates a speed step number after shifting and the rotational speed difference is zero. It is judged as a dog-tip caught state if the signal outputted from the gear position sensor indicates a speed step number before or after shifting and the rotational speed difference is a transmission gear ratio difference.

16 Claims, 11 Drawing Sheets

| A) RELEASE COMPLETION | GEAR POSITION SENSOR SIGNAL | TARGET GEAR STEP | INNER AND OUTER MAIN SHAFT ROTATIONAL SPEED DIFFERENCE | ZERO (SIMULTANEOUS ROTATION) |
|---|---|---|---|---|
| B) DOG-TIP CAUGHT | | TARGET GEAR STEP OR BEFORE-SHIFTING GEAR STEP | | SPEED DIFFERENCE FOR RATIO DIFFERENCE BETWEEN BEFORE AND AFTER SHIFTING |

| C) ENGAGEMENT COMPLETION | GEAR POSITION SENSOR SIGNAL | TARGET GEAR STEP | INNER AND OUTER MAIN SHAFT ROTATIONAL SPEED DIFFERENCE | SPEED DIFFERENCE FOR RATIO DIFFERENCE BETWEEN BEFORE AND AFTER SHIFTING |
|---|---|---|---|---|
| D) DOG-TIP ABUTMENT | | TARGET GEAR STEP OR BEFORE-SHIFTING GEAR STEP | | SPEED DIFFERENCE FOR RATIO DIFFERENCE BETWEEN BEFORE AND AFTER SHIFTING OR A SMALLER DIFFERENCE OCCURS |

FIG.9

TWIN CLUTCH TYPE SPEED-CHANGE APPARATUS

CROSS-REFERENCE TO RELATED APPLICATIONS

The present application claims priority under 35 USC 119 to Japanese Patent Application No. 2007-336426 filed on Dec. 27, 2007 the entire contents of which are hereby incorporated by reference.

BACKGROUND OF THE INVENTION

1. Field of the Invention

The present invention relates generally to twin clutch type speed-change apparatuses. More particularly to a twin clutch type speed-change apparatus that can detect an engagement state of a dog clutch by use of the rotational speed difference between an inner main shaft and an outer main shaft and of a signal outputted from a gear position sensor.

2. Description of Background Art

A transmission is known that includes a plurality of gear pairs between a main shaft and a counter shaft that are configured to execute a shifting operation by turning a shift drum arranged parallel to the shafts to axially slide a shift fork engaged with the shift drum. Such a transmission can detect a currently selected speed step number by detecting the turning angle of the shift drum.

Japanese Utility Model Laid-Open No. Sho 61-202744 discloses a configuration for detecting a speed step number corresponding to the turning position of a shift drum on the basis of a signal outputted by a gear position sensor mounted at the end of the shift drum.

In addition, a multi-stage transmission is known in sequential transmissions using a shift drum. This multi-stage transmission enables an automatic or semi-automatic transmission control by driving a shift drum or a clutch by means of an actuator or the like. Such transmissions generally transmit a rotational drive force between coaxially adjacent speed-change gears by means of a dog clutch consisting of dog teeth and dog apertures. The dog clutch provides high-efficiency for transmitting a rotational drive force. On the other hand, a rotational speed difference may be large between a speed-change gear formed with dog teeth and a speed-change gear formed with dog apertures. In such a case, the dog clutch sometimes causes a dog-tip caught state where a dog tooth is not drawn out of a corresponding dog aperture or a dog-tip abutting state where a dog tooth is not inserted into a corresponding dog aperture. To surely execute a shifting operation by electrically driving a clutch or the shift drum, it is preferred that the engagement state of the dog clutch described above can be detected. However, to detect the engagement state of the dog clutch by the gear position sensor as disclosed in Japanese Utility Model Laid-Open No. Sho 61-202744, it is necessary to significantly increase the sensor accuracy to more finely detect the turning angle of the shift drum.

SUMMARY AND OBJECTS OF THE INVENTION

It is an object of an embodiment of the present invention to solve the above problem and to provide a twin clutch type speed-change apparatus that can detect the engagement state of a dog clutch by use of a rotational speed difference between an inner main shaft and an outer main shaft and of a signal outputted from a gear position sensor.

To achieve the above object according to an embodiment of the present invention, a twin clutch type speed-change apparatus includes a transmission having a plurality of gear pairs between a main shaft and a counter shaft and a twin clutch provided on the main shaft. The twin clutch is adapted to connect or disconnect a rotational drive force of an engine between the engine and the transmission; the main shaft is composed of an inner main shaft and an outer main shaft rotatably supporting the inner main shaft. The twin clutch is composed of a first clutch adapted to connect or disconnect the rotational drive force transmitted to the inner main shaft and a second clutch adapted to connect or disconnect the rotational drive force transmitted to the outer main shaft. The transmission is configured to execute transmission of the rotational drive force between speed-change gears adjacent to each other on each of the shafts by means of a dog clutch composed of a dog tooth and a dog aperture; and the speed-change apparatus includes a gear position sensor for detecting a speed-change step number of the transmission on the basis of a turning position of a shift drum, an inner main shaft rotational speed sensor for detecting a rotational speed of the inner main shaft, an outer main shaft rotational speed sensor for detecting a rotational speed of an outer main shaft, and a control unit for shift-controlling the transmission. The control unit detects an engagement state of the dog clutch on the basis of a rotational speed difference between the inner main shaft and the outer main shaft and of information on the speed step number.

According to an embodiment of the present invention, the inner main shaft rotational speed sensor detects a rotational speed of a speed-change gear attached to the counter shaft so as to be rotatable and not-slidable with respect thereto and meshed with a speed-change gear attached to the inner main shaft so as not to be rotatable with respect thereto. In addition, the outer main shaft rotational speed sensor detects a rotational speed of a speed-change gear attached to the counter shaft so as to be rotatable and not-slidable with respect thereto and meshed with a speed-change gear attached to the outer main shaft so as not to be rotatable with respect thereto.

According to an embodiment of the present invention, the control unit, when engagement of the dog clutch is to be released, judges that the release of the engagement is normally completed if a signal outputted from the gear position sensor indicates a speed step number after shifting and the rotational speed difference is zero, and judges that the dog clutch is in a dog-tip caught state where the dog tooth is not drawn from the dog aperture if a signal outputted from the gear position sensor indicates a speed step number before or after shifting and the rotational speed difference is a transmission gear ratio difference between before and after shifting. On the other hand, the control unit, when the dog clutch is to be engaged, judges that the engagement is normally completed if a signal outputted from the gear position sensor indicates a speed step number after shifting and the rotational speed difference is a transmission gear ratio difference between before and after shifting, and judges that the dog clutch is in a dog-tip abutting state where the dog tooth is not inserted into the dog aperture if a signal outputted from the gear position sensor indicates a speed step number before shifting and the rotational speed difference is equal to or less than a transmission gear ratio difference between before and after shifting.

The present invention is fourthly characterized in that the gear pair is composed of a slidable gear axially slidably attached to select a gear pair adapted to transmit a rotational drive force to the counter shaft and an axially non-slidably attached non-slidable gear, the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto, the transmission is configured to be shiftable to an adjacent speed step by switching the engagement state of the twin clutch when the slidable gear is located at a predetermined position, and the dog clutch is disposed between the slidable gear and the non-slidable gear coaxially adjacent to the slidable gear.

According to an embodiment of the present invention, the engagement state of the dog clutch can be detected on the basis of the difference between the respective rotational speeds of the outer main shaft and inner main shaft detected by the outer main shaft rotational speed sensor and the inner main shaft rotational speed sensor, respectively, and of information on the speed step number detected by the gear position sensor. If the engagement state of the dog clutch is to be detected only by the turning position of the shift drum, it becomes necessary to significantly increase the accuracy of the gear position sensor. In contrast, it is possible to detect the engagement state of the dog clutch by using the gear position sensor with general accuracy. Since the engagement state of the dog clutch can be detected, if the dog clutch does not operate as scheduled, it is possible to correct the engagement state of the dog clutch by appropriately driving the shift drum or the twin clutch.

According to an embodiment of the present invention, the inner main shaft rotational speed sensor detects a rotational speed of a speed-change gear attached to the counter shaft so as to be rotatable and not-slidable with respect thereto and meshed with a speed-change gear attached to the inner main shaft so as not to be rotatable with respect thereto, and the outer main shaft rotational speed sensor detects a rotational speed of a speed-change gear attached to the counter shaft so as to be rotatable and not-slidable with respect thereto and meshed with a speed-change gear attached to the outer main shaft so as not to be rotatable with respect thereto. Thus, the arrangement layout for the rotational speed sensors and the like can be facilitated as compared with a method of detecting the rotational speed of a speed-change gear rotated simultaneously with the counter shaft and having a low number of teeth or of a speed-change gear non-rotatably and slidably attached to the main shaft.

According to an embodiment of the present invention, the control unit, when engagement of the dog clutch is to be released, judges that the release of the engagement is normally completed if a signal outputted from the gear position sensor indicates a speed step number after shifting and the rotational speed difference is zero, and judges that the dog clutch is in a dog-tip caught state where the dog tooth is not drawn from the dog aperture if a signal outputted from the gear position sensor indicates a speed step number before or after shifting and the rotational speed difference is a transmission gear ratio difference between before and after shifting. On the other hand, the control unit, when the dog clutch is to be engaged, judges that the engagement is normally completed if a signal outputted from the gear position sensor indicates a speed step number after shifting and the rotational speed difference is a transmission gear ratio difference between before and after shifting, and judges that the dog clutch is in a dog-tip abutting state where the dog tooth is not inserted into the dog aperture if a signal outputted from the gear position sensor indicates a speed step number before shifting and the rotational speed difference is equal to or less than a transmission gear ratio difference between before and after shifting. Thus, the four states that may probably be caused by the dog clutch during shifting can be detected on the basis of information outputted from the gear position sensor, from the inner main shaft rotational speed sensor, and from the outer main shaft rotational sensor.

According to an embodiment of the present invention, the gear pair is composed of a slidable gear axially slidably attached to select a gear pair adapted to transmit a rotational drive force to the counter shaft and an axially non-slidably attached non-slidable gear, the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto, the transmission is configured to be shiftable to an adjacent speed step by switching the engagement state of the twin clutch when the slidable gear is located at a predetermined position, and the dog clutch is disposed between the slidable gear and the non-slidable gear coaxially adjacent to the slidable gear. Thus, in the twin clutch speed-change apparatus in which the shifting operation is completed by switching the engagement state of the first clutch and of the second clutch from one of the first and second clutches to the other, the engagement state of the dog clutch can be detected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 includes tables illustrating judgment conditions for the engagement state of the dog clutch;

DETAILED DESCRIPTION OF THE PREFERRED EMBODIMENTS

Preferred embodiments of the present invention will hereinafter be described in detail with reference to the drawings.

Figure 1:
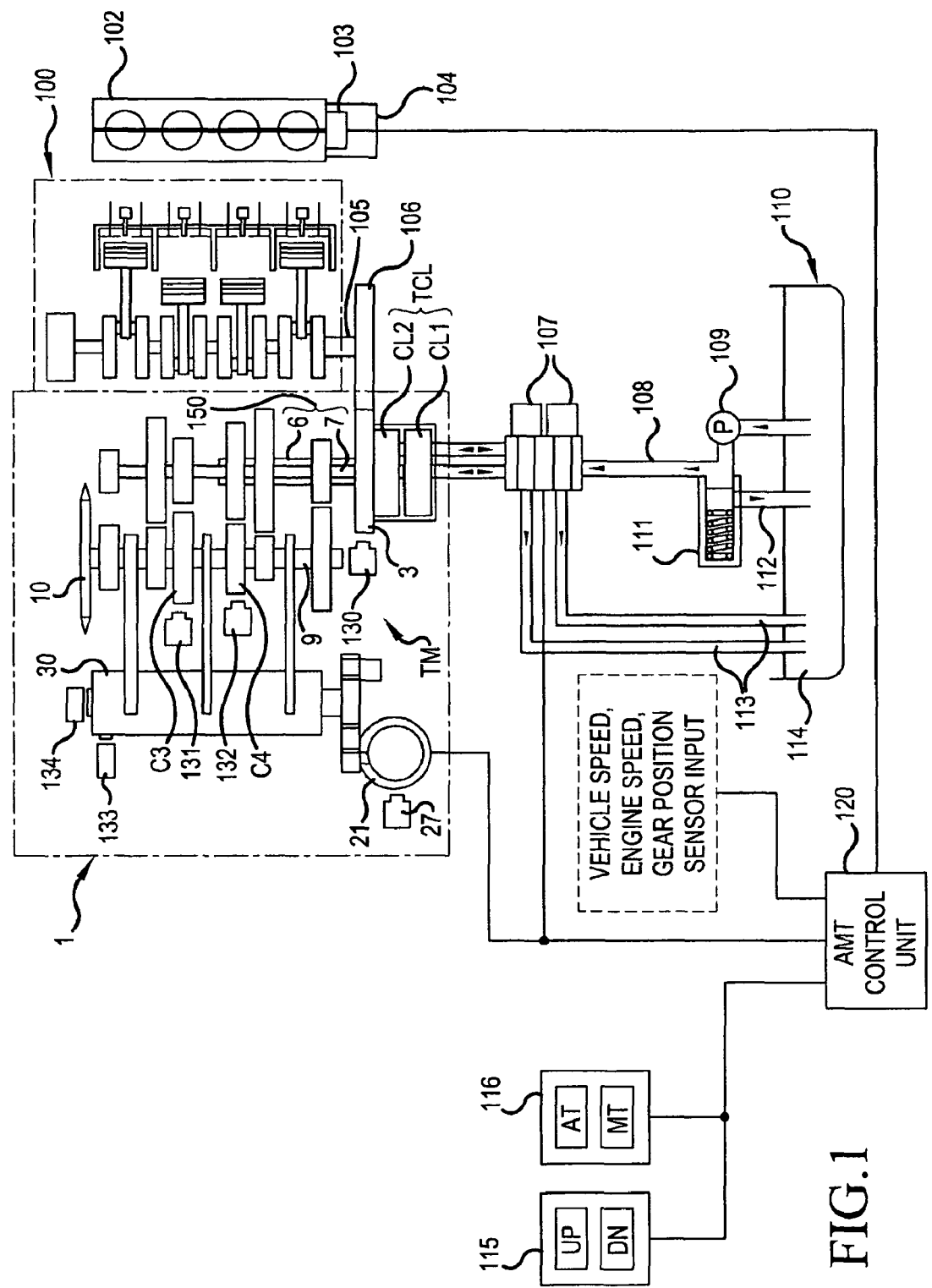
FIG. 1 is a system diagram of an AMT and peripheral devices thereof applied to a motorcycle.

FIG. 1 is a system diagram of an automated manual-transmission (hereinafter called "AMT") as an automatic transmission applied to a motorcycle and of peripheral devices thereof. The AMT 1 is constructed as a twin clutch type speed-change apparatus which connects or disconnects the rotational drive force of an engine by two clutches disposed on a primary shaft (a main shaft). The AMT 1 connected to an engine 100 is drivingly controlled by a clutch hydraulic device 110 and by an AMT control unit 120 as a control section. The engine 100 includes a throttle-by-wire type throttle body 102, which is provided with a throttle opening-closing motor 104.

The ATM 1 includes a six-forward-speed transmission TM, a twin clutch TCL composed of a first clutch CL1 and a second clutch CL2, a shift drum 30 and a shift control motor 21 adapted to turn the shift drum 30. A large number of gears constituting part of the transmission TM are connected to or loosely fitted to the primary shaft (the main shaft) 150 and to a counter shaft 9. The main shaft 150 is composed of an inner main shaft 7 and an outer main shaft 6. The inner main shaft 7 is connected to the first clutch CL1 and the outer shaft 6 is connected to a second clutch CL2. The main shaft 150 and the counter shaft 9 are each provided with speed-change gears axially displaceable with respect thereto. The shift forks are engaged at ends with the speed-change gears and with a plurality of guide grooves formed on the shift drum 30.

A primary drive gear 106 is connected to an output shaft of the engine 100, i.e., to a crankshaft 105 and is meshed with a primary driven gear 3. The primary driven gear 3 is connected to the inner main shaft 7 via the first clutch CL1 and to the outer main shaft 6 via the second clutch CL2. The AMT 1 is provided with an inner main shaft rotational speed sensor 131 and with an outer main shaft rotational speed sensor 132. The inner main shaft rotational speed sensor 131 and the outer main shaft rotational speed sensor 132 detect the respective rotational speeds of the inner main shaft 7 and the outer main shaft 6 by measuring the corresponding predetermined speed-change gears on the counter shaft 9.

The inner main shaft rotational speed sensor 131 detects the rotational speed of a speed-change gear C3 that is meshed with a speed-change gear carried on the inner main shaft 7 so as to be incapable of rotation and that is attached to the counter shaft 9 so as to be rotatable and non-slidable. The outer main shaft rotational speed sensor 132 detects the rotational speed of a speed-change gear C4 that is meshed with a speed-change gear attached to the outer main shaft 6 so as not to be rotatable and that is attached to the counter shaft 9 so as to be rotatable and non-slidable. In addition, the details of gear trains arranged on the shafts are described later.

A drive sprocket 10 is joined to the counter shaft 9. A drive chain (not shown) is wound around the drive sprocket 10. A drive force is transmitted to a rear wheel (not shown) via the drive chain (not shown). The ATM 1 internally includes an engine speed sensor 130, a gear position sensor 134, a shifter switch 27, and a shift drum neutral switch 133. The engine speed sensor 130 is disposed to face the outer circumference of the primary driven gear 3. The gear position sensor 134 detects a current gear step from the turning position of the shift drum 30. The shifter switch 27 detects the turning position of a shifter driven by the shift control motor 21. The shift drum neutral switch 133 detects the shift drum 30 located at the neutral position. The throttle body 102 is provided with a throttle opening angle sensor 103 for detecting a throttle opening angle.

The clutch hydraulic device 110 includes an oil tank 114 and a pipe line 108 adapted to supply oil in the oil tank 114 to the first clutch CL1 and to the second clutch CL2. A hydraulic pump 109 and a valve 107 serving as a hydraulic control valve composed of a solenoid valve or the like are provided on the pipe line 108. A regulator 111 is provided on a return pipe 112 connected to the pipe line 108. The valve 107 is constructed to be able to individually apply oil pressure to the first clutch CL1 and to the second clutch CL2. Also oil return pipes 113 are connected to the valve 107.

A mode switch 116 and a shift selector switch 115 are connected to the ATM control unit 120. The mode switch 116 performs switching between automatic transmission (AT) and manual transmission (MT). The shift selector switch 115 instructs upshift (UP) and a downshift (DN). The AMT control unit 120 includes a microcomputer (CPU) and controls the valve 107 and the shift control motor 21 in response to the output signals from the above-mentioned sensors and switches to automatically or semi-automatically switch the gear steps of the AMT 1.

Upon selecting the AT mode, the AMT control unit 120 automatically switches the speed steps in response to information such as vehicle speed, engine speed, a throttle opening angle or the like. On the other hand, upon selecting the MT mode, the AMT control unit 120 upshifts or downshifts the transmission TM along with the operation of the shift selector switch 115. In addition, the AMT control unit 120 can be set so that auxiliary automatic speed-change control can be exercised to prevent the excessive rotation and stall of the engine also upon selection of the MT mode.

In the clutch hydraulic device 110, the hydraulic pressure applied to the valve 107 by the hydraulic pump 109 is controlled by the regulator 111 not to exceed an upper limit. If the valve 107 is opened by an instruction from the ATM control unit 120, the hydraulic pressure is applied to the first or second clutch CL1, CL2 to connect the primary driven gear 3 with the inner main shaft 7 or the outer main shaft 6 via the first or second clutch CL1, CL2, respectively. If the valve 107 is closed to stop the application of the hydraulic pressure, the first and second clutches CL1, CL2 are biased by respective built-in return springs (not shown) in a direction of disconnecting the connection with the inner main shaft 7 and the outer main shaft 6, respectively.

The shift control motor 21 turns the shift drum 30 in accordance with the instruction from the AMT control unit 120. If the shift drum 30 is turned, a shift fork is displaced in accordance with the shape of the guide groove formed on the outer circumference of the shift drum 30. This displacement changes the meshing between the respective gears on the counter shaft 9 and the main shaft 150 to switch the transmission into a possible upshift or downshift state.

The ATM 1 according to the present embodiment is constructed such that the inner main shaft 7 (see FIG. 1) connected to the first clutch CL1 carries odd step gears (first, third and fifth speeds) and the outer main shaft 6 connected to the second clutch CL2 carries even step gears (second, fourth and sixth speeds). For example, during traveling with an odd step gear selected, hydraulic pressure is continuously supplied to the first clutch CL1 to maintain the engagement state. To sequentially perform sifting, the meshing of gears is previously changed by turning the shift drum 30 and then the respective engagement states of the first and second clutches CL1, CL2 are changed, completing the shifting.

Figure 2:
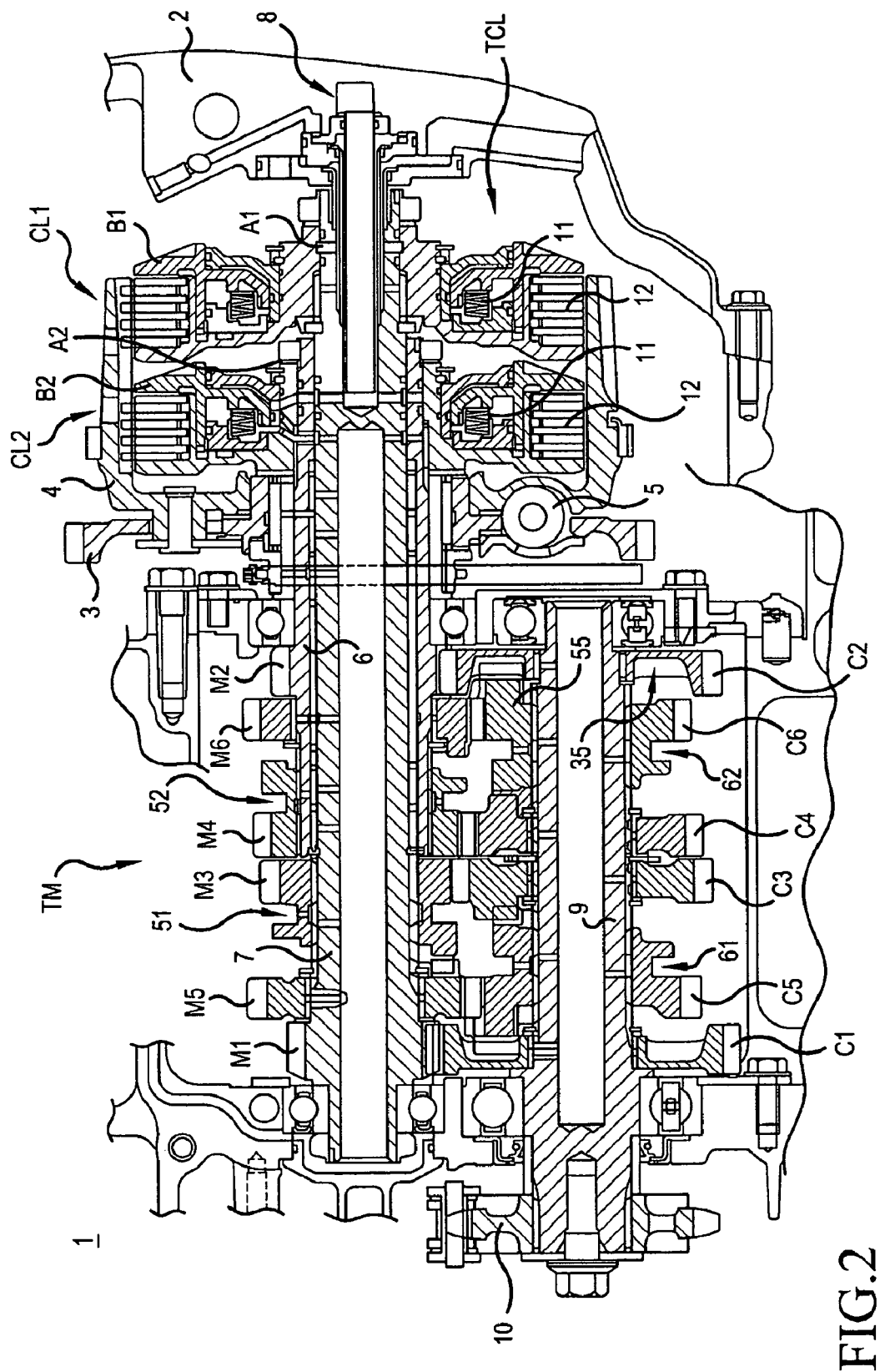
FIG. 2 is an enlarged cross-sectional view of a twin clutch type speed-change apparatus.
Figure 3:
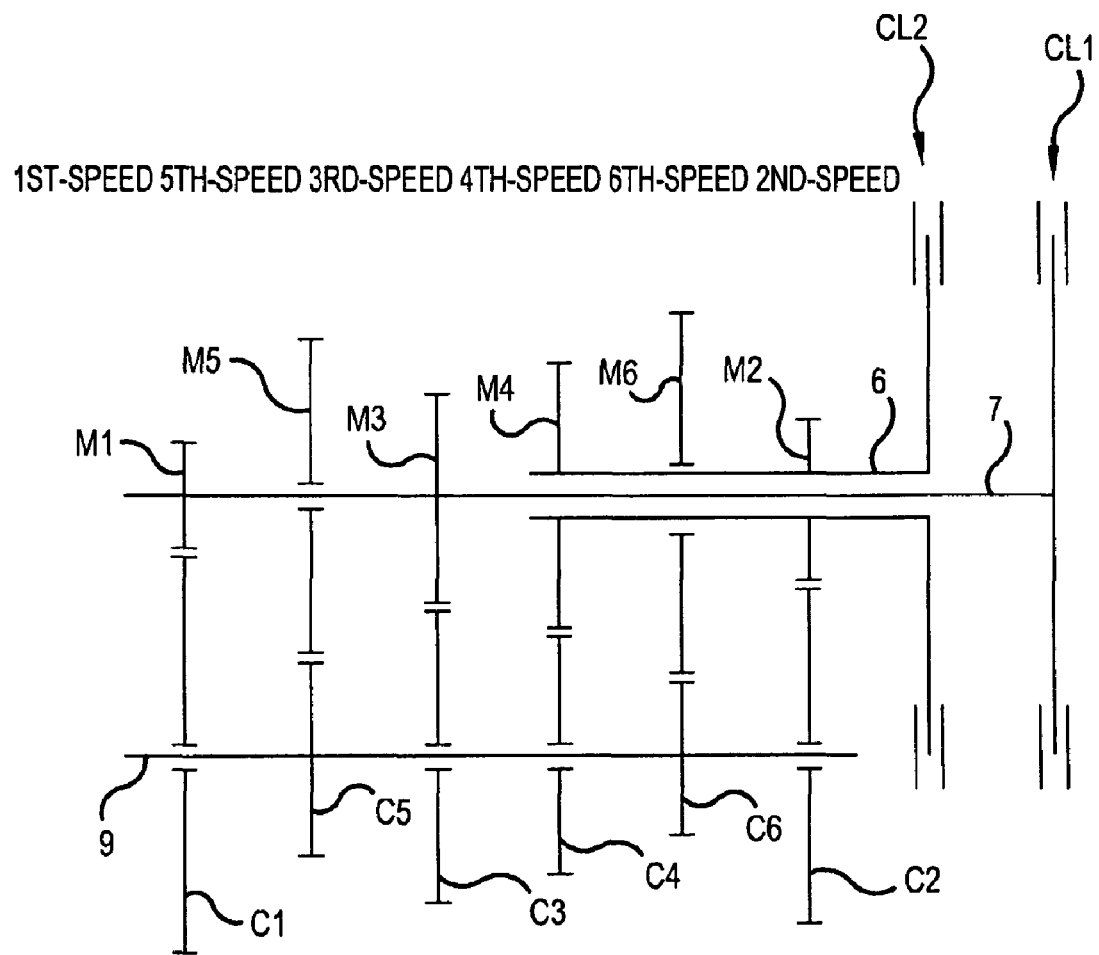
FIG. 3 is a skeleton diagram illustrating an arrangement relationship among speed-change gears.

FIG. 2 is an enlarged cross-sectional view of the twin clutch speed-change apparatus 1. FIG. 3 is a skeleton diagram illustrating the arrangement of the speed-change gears of the twin clutch speed-change apparatus 1. The same symbols as those in FIG. 1 denote like or corresponding portions. A rotational drive force is transmitted from the crankshaft 105 of the engine 100 to the primary driven gear 3 having a shock absorbing mechanism 5. This rotational drive force is transmitted to the counter shaft 9 attached with the drive sprocket 10 through the twin clutch TCL, the outer main shaft 6 or the inner main shaft 7 rotatably supported by the outer main shaft 6, and a six gear pairs provided between the outer main shaft 6 and inner main shaft 7 and counter shaft 9.

The transmission TM has the six gear pairs provided between the main shaft and the countershaft. The transmission TM can select a gear pair through which the rotational drive force is outputted, based on the combination of the positions of slidable gears axially slidably carried on the respective shafts with the engagement/disengagement states of the first and second clutches CL1, CL2. The twin clutch TCL is disposed inside a clutch case 4 rotated integrally with the primary driven gear 3. The first clutch CL1 is non-rotatably mounted to the inner main shaft 7, whereas the second clutch CL2 is non-rotatably mounted to the outer main shaft 6. A clutch board 12 is disposed between the clutch case 4 and each of the clutches CL1, CL2. The clutch board 12 is composed of four clutch plates non-rotatably carried by the clutch case 4 and four friction plates non-rotatably carried by each of the clutches CL1, CL2.

The first and second clutches CL1, CL2 are each configured to receive hydraulic pressure supplied from a hydraulic pump driven by the rotation of the crankshaft 105 to allow the clutch board 12 to cause a frictional force, thereby switching into the engaging state. A distributor 8 which forms two double-pipe hydraulic paths inside the inner main shaft 7 is buried in the wall surface of the crankcase 2. If hydraulic pressure is supplied via the valve 107 to the distributor 8 and then supplied to an oil path A1 formed in the inner main shaft 7, a piston B1 is slid to the left in the figure against the elastic force of an elastic member 11 such as a spring or the like to switch the first clutch CL1 into the engaging state. Similarly, if hydraulic pressure is supplied to an oil path A2, a piston B2 is slid to the left to switch the second clutch CL2 into the engaging state. If the application of hydraulic pressure is stopped, both the clutches CL1, CL2 are each returned to an original position by the elastic force of the elastic member 11.

With such a configuration described above, the rotational drive force of the primary driven gear 3 rotates only the clutch case 4 unless hydraulic pressure is supplied to the first clutch CL1 or to the second clutch CL2. If the hydraulic pressure is supplied, the outer main shaft 6 or the inner main shaft 7 is drivingly rotated integrally with the clutch case 4. In addition, the magnitude of the supply of hydraulic pressure is adjusted at this time to create partial clutch engagement as well.

The inner main shaft 7 connected to the first clutch CL1 carries drive gears M1, M3, M5 for odd speed steps (first-speed, third-speed and fifth-speed). The first-speed drive gear M1 is formed integrally with the inner main shaft 7. The third-speed drive gear M3 is attached to the inner main shaft through spline-engagement so as to be axially slidable and incapable of circumferential rotation. The fifth-speed drive gear M5 is attached to the inner main shaft so as to be axially slidable and incapable of circumferential rotation.

On the other hand, the outer main shaft 6 connected to the second clutch CL2 carries drive gears M2, M4, M6 for even speed steps (second-speed, fourth-speed and sixth-speed). The second-speed drive gear M2 is formed integrally with the inner main shaft 7. The fourth-speed drive gear M4 is attached to the outer main shaft so as to be axially slidable and incapable of circumferential rotation. The sixth speed drive gear M6 is attached to the outer main shaft so as to be incapable of axial slide and circumferentially rotatable.

The countershaft 9 carries driven gears C1, C2, C3, C4, C5 and C6 meshed with the drive gears M1, M2, M3, M4, M5, and M6, respectively. The first-through fourth-speed driven gears C1 through C4 are attached to the countershaft so as to be incapable of axial slide and circumferentially rotatable. The fifth- and sixth-speed driven gears C5, C6 are attached to the countershaft so as to be axially slidable and incapable of circumferential rotation.

The drive gears M3, M4 and driven gears C5, C6 of the gear trains described above, i.e., the axially slidable "slidable gears" are each configured to be slid along with the operation of a corresponding one of the shift forks described later. The slidable gears are respectively formed with engaging grooves 51, 52, 61 and 62 adapted to engage the claw portions of the shift forks.

In addition, as described above, the inner main shaft rotational speed sensor 131 (see FIG. 1) detects the rotation speed of the third-speed driven gear C3 and the outer main shaft rotational speed sensor 132 detects the rotational speed of the fourth-speed driven gear C4. This configuration facilitates the arrangement layout of the rotational speed sensors, etc. compared with the case of detecting the rotational speed of the first-speed drive gear M1 formed integrally with the inner main shaft 7 and having the low number of teeth, the second-speed drive gear M2 formed integrally with the outer main shaft 6, the third-speed drive gear M3 sliding on the inner main shaft 7, or the fourth-speed drive gear M4 sliding on the outer main shaft 6.

The speed-change gears (the drive gears M1, M2, M5, M6 and the driven gears C1 to C4) other than the slidable gears described above, i.e., the axially non-slidable "non-slidable" gears are configured to execute connection/disconnection of the rotational drive force with the adjacent slidable gears. With the configuration described above, the twin clutch type speed-change apparatus 1 according to the embodiment described above can optionally select one gear pair transmitting a rotational drive force through the combination of the positions of the slidable gears with the engagement/disengagement of the first and second clutches CL1, CL2.

In the twin clutch speed-change apparatus 1 of the present embodiment, a dog clutch mechanism is applied to a structure of connecting or disconnecting a rotational drive force between the slidable gear and the non-slidable gear. This dog clutch mechanism transmits the rotational drive force through meshing of the respective convex and concave shapes of a dog tooth and a dog aperture. Thus, the simple configuration can transmit a drive force with less transmission loss. The transmission TM according to the embodiment executes the transmission of a rotational drive force between driven gears C2, C6 by allowing four dog teeth 55 formed in the sixth-speed driven gear C6 to mesh with four dog apertures 35 formed in the second-speed driven gear C2.

Figure 4:
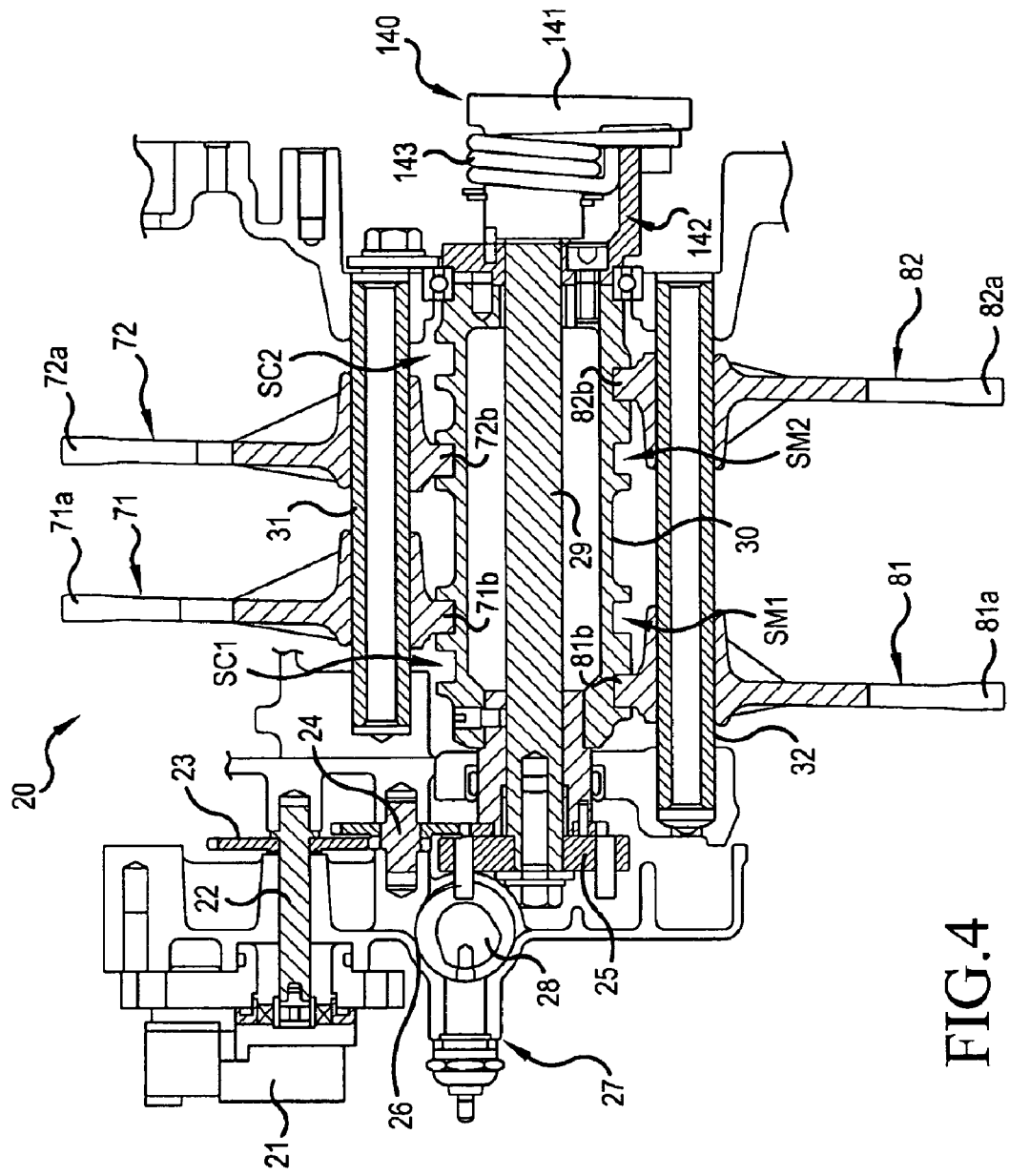
FIG. 4 is a cross-sectional view of a shifting mechanism.
Figure 5:
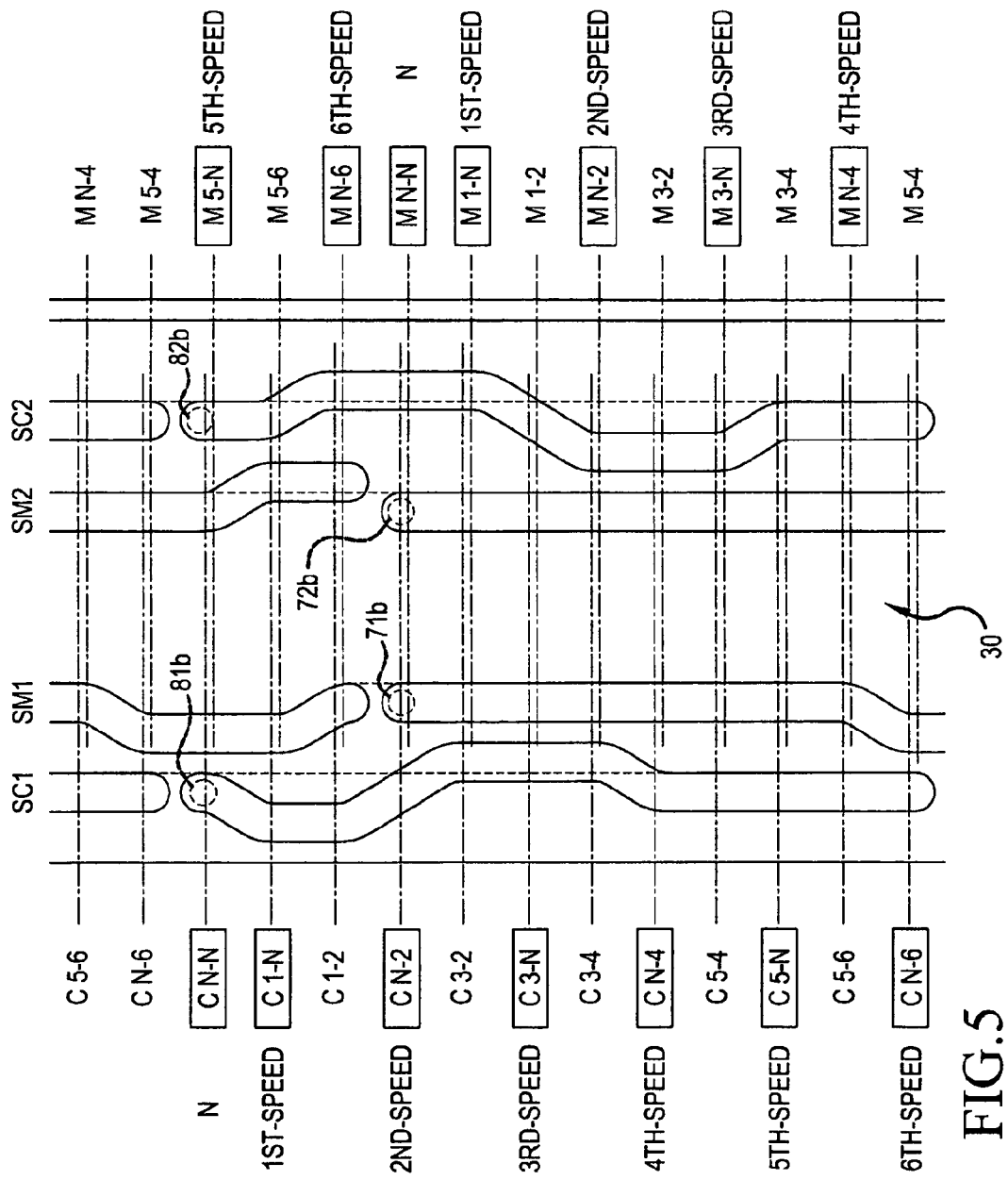
FIG. 5 is a development view illustrating the shapes of guide grooves of a shift drum.

FIG. 4 is a cross-sectional view of a shifting mechanism 20 which drives the four slidable gears of the transmission. FIG. 5 is a development view illustrating the shapes of the guide grooves on the shift drum 30. To drive the four slidable gears mentioned above, the shifting mechanism 20 is provided with four shift forks 71, 72, 81, 82, more specifically, the shift forks 71, 72 being slidably attached to the guide shaft 31, the shift forks 81, 82 being slidably attached to the guide shift 32. The four shift forks are provided with respective guide claws (71a, 72a, 81a, 82a) engaged with the corresponding slidable gears and with cylindrical projections (71b, 72b, 81b, 82b) engaged with the corresponding guide grooves formed on the shift drum 30.

The guide shaft 31 is attached with the shift fork 71 engaged with the third-speed drive gear M3 and with the shift fork 72 engaged with the fourth-speed drive gear M4. The other guide shaft 32 is attached with the shift fork 81 engaged with the fifth-speed driven gear C5 and with the shift fork 82 engaged with the sixth-speed driven gear C6.

Guide grooves SM1 and SM2 engaged with the main shaft side shift forks 71 and 72, respectively, and guide grooves SC1 and SC2 engaged with the countershaft side shift forks 81 and 82, respectively, are formed in the surface of the shift drum 30 disposed parallel to the guide shafts 31, 32. Thus, the slidable gears M3, M4, C5 and C6 are each driven along a corresponding one of the respective shapes of the four guide grooves along with turning of the shift drum 30.

The shift drum 30 is turnably driven to a predetermined position by a shift control motor 21 as an actuator. The rotational drive force of the shift control motor 21 is transmitted to a shift drum shaft 29 supporting the hollow cylindrical shift drum 30 via a first gear 23 secured to a rotational shaft 22 and via a second gear 24 meshed with the first gear 23. The shift drum shaft 29 is connected to the shift drum 30 via a lost-motion mechanism 140.

The lost motion mechanism 140 is a mechanism as below. The shift drum shaft 29 and the shift drum 30 are connected to each other via a torsion spring coil 143. For example, the shift drum 30 may not be turned as scheduled because the dog clutch is not engaged. Even in such a case, the motion of the shift control motor 21 is temporarily absorbed by the torsion coil spring 143 to prevent the shift control motor 21 from generating an excessive load. The lost motion mechanism 140 includes a drive rotor 141 mounted at an end of the shift drum shaft 29; a driven rotor 142 mounted at an end of the shift drum 30; and a coil spring 143 connecting the drive rotor 141 with the driven rotor 142. With this configuration, if the shift drum 30 comes into a turnable state with the motion of the shift control motor 21 temporarily absorbed, the shift drum 30 is turned to a predetermined position by the elastic force of the torsion coil spring 143.

The gear position sensor 134 (see FIG. 1) is arranged to detect the turning angle of the shift drum 30 or of the driven rotor 142 in order to detect the actual turning angle of the shift drum 30. The shifter switch 27 detects whether or not the shift control motor 21 is located at a predetermined position on the basis of the position of a cam 28 turned by a pin 26 buried in the shifter 25 secured to the shift drum shaft 29.

A description is given of the positional relationship between the turning position of the shift drum 30 and the four shift forks with reference to the development view of FIG. 5. The guide shafts 31, 32 are disposed at respective positions spaced circumferentially apart from each other at about 90° with reference to the turning shaft of the shift drum 30. For example, if the turning position of the shift drum 30 is at neutral (N), the shift forks 81, 82 are located at a position indicated with "C N-N" on the left in FIG. 5, whereas the shift forks 71, 72 are located at a position indicated with "M N-N" on the right in FIG. 5. In FIG. 5, a broken line circle indicates the position of the cylindrical projection (71b, 72b, 81b, 82b) in each shift fork at the time of neutral. The predetermined turning positions downwardly continuous from indication "C N-N" on the left in FIG. 5 are provided at 30° intervals. Similarly, the predetermined turning positions downwardly continuous from indication "M N-N" on the right FIG. 5 are provided at 30° intervals.

The sliding positions of the shift forks determined by the associated guide grooves are such that the guide grooves SM1, SM2 on the main shaft side each assume two positions, "the left position" and "the right position," whereas the guide grooves SC1, SC2 on the countershaft side each assume three positions, "the left position," "the middle position" and "the right position".

The shift forks during neutral are located as follows: the shift fork 81: middle position, the shift fork 82: middle position, the shift fork 71: right position and the shift fork 72: left position. This state is such that the four slidable gears driven by the respective associated shift forks are each not meshed with a corresponding one of the adjacent non-slidable gears. Thus, even if the first and second clutches CL1, CL2 are each engaged, the rotational drive force of the primary gear 3 is not transmitted to the countershaft 9.

If the shift drum 30 is next turned to the position ("C 1-N" and "M 1-N") corresponding to the first-speed gear from the neutral position mentioned above, the shift fork 81 is switched from the middle position to the left position to cause the fifth-speed driven gear C5 to switch to the left position from the middle position. This allows the fifth-speed driven gear C5 to mesh with the first-speed driven gear C1 via the dog clutch, providing the rotational drive force-transmittable state. In this state, if the first clutch CL1 is next switched to the engagement state, the rotational drive force is transmitted in the order of the inner main shaft 7, the first-speed drive gear M1, the first-speed driven gear C6, the fifth-speed driven gear C5 and the countershaft 9, and outputted from the drive sprocket 10.

When the upshifting to the first-speed gear is completed, the shift drum 30 is automatically turned in the upshifting direction by 30°. This turning operation is called "preliminary upshifting" which intends to complete shifting only by switching the engagement state of the twin clutch TCL when a command is issued to upshift from the first-speed to the second-speed. This preliminary upshifting allows the two guide shafts to move to the respective positions of "C 1-2" and "M 1-2" indicated on the left and right, respectively, of FIG. 5 relatively to the shift drum 30.

The changes of the guide grooves resulting from the preliminary upshifting are such that only the guide groove SC2 is switched from the middle position to the right position. This allows the shift fork 82 to be moved to the right position, thereby causing the sixth-speed driven gear C6 to mesh with the driven gear C2 via the dog clutch. At the time of completing the preliminary upshifting from the first-speed to the second-speed, since the second clutch CL2 is in the disengaging state, the outer main shaft 6 is turned in a following manner by the viscosity of the lubricating oil filled between the inner main shaft 7 and the outer main shaft 6.

The sliding operation of the driven gear C6 resulting from the preliminary upshifting as described above completes a preparation for transmitting the rotational drive force via the second-speed gear. If a command is issued to upshift from the first-speed to the second-speed in this state, the first clutch CL1 is disengaged while the second clutch CL2 is switched to the engaging state. This switching operation of the twin clutch TCL instantaneously outputs the rotational drive force via the second-speed gear without interruption.

When the shifting operation from the first-speed to the second-speed is completed, the preliminary upshifting is executed to complete the shifting operation from the second speed to the third speed only by the switching of the twin clutch TCL. In the preliminary upshifting from the second-speed to the third-speed, the countershaft side guide shaft is moved to the position "C 3-2" from "C 1-2" indicated on the left of FIG. 5, while the main shaft side guide shaft is moved to the position "M 3-2" from "M 1-2" on the right the FIG. 5. The changes of the guide grooves resulting from such movements are such that only the guide groove SC1 switches from the left position to the right position. This allows the shift fork 81 to be moved from the left position to the right position, thereby causing the fifth-speed driven gear C5 and the third-speed driven gear C3 to be meshed with each other via the dog clutch.

When the preliminary upshifting from the second-speed to the third-speed is completed, the engagement state of the twin clutch TCL is switched from the second clutch CL2 to the first clutch CL1. In other words, only the switching of the clutches provides the state where the shifting operation from the second-speed to the third-speed is executable. This preliminary upshifting can similarly be executed from then until the fifth-speed gear is selected.

During the preliminary upshifting from the second-speed to the third-speed described above, the guide groove SC1 passes the middle position of "C N-2" indicated on the left side of FIG. 5, i.e., the position where the engagement of the dog clutch is not executed. The angle of the shift drum 30 is detected by the gear position sensor 134 at 30° intervals and the turning speed of the shift drum can minutely be adjusted by the shift control motor 21. This can allow e.g., the turning speed from "C 1-2" to "C N-2" indicated on the left of FIG. 5, i.e., the speed encountered when the engagement of the dog clutch is released between the driven gears C1, C5 to differ from the turning speed from "C N-2" to "C 3-2," i.e., the speed encountered when the dog clutch is engaged between the driven gears C5, C3. In addition, this can execute "neutral-waiting" where the shift drum 30 stops for a predetermined time at the position of "C N-2." Thus, it is possible to reduce shift shock liable otherwise to occur at the time of the engagement disengagement of the dog clutch. Further, the drive timing and drive speed of the shift drum 30 can sequentially be adjusted according to a speed step number and engine speed during shifting.

As described above, the engagement of the dog clutch and the release thereof are repeatedly executed during shifting. In terms of the configuration of the meshing of the dog teeth with the dog apertures, the meshing and release thereof may smoothly not complete in some cases when a difference occurs between respective drive forces applied to the dog teeth and to the dog apertures. More specifically, during the preliminary upshifting from the second-speed to the third-speed, the engagement of the dog clutch is released between the first-speed driven gear C1 and the fifth-speed driven gear C5. However, during such release, "a dog-tip caught state" where the dog teeth are not drawn from the corresponding dog apertures occurs and thus the release is not smoothly completed in some cases. During the preliminary upshifting from the first-speed to the second-speed, the dog teeth 55 of the sixth-speed driven gear C6 are meshed with the dog aperture 35 of the second-speed driven gear C2. However, during such engagement, "a dog-tip abutting state" occurs where the dog teeth 55 are not inserted into the corresponding dog aperture 35, remaining abutted against the lateral wall surface of the second-speed driven gear C2. Thus the engagement is not smoothly completed in some cases.

The twin clutch speed-change apparatus according to the present embodiment uses information outputted from the gear position sensor 134, from the inner main shaft rotational speed sensor 131, and from the outer main shaft rotational speed sensor 132 in order to detect "the dog-tip caught state" and "dog-tip abutting state" as described above as well as the completed engagement and release of the dog clutch. The four modes of the dog clutch as described above can be detected by more finely detecting the rotational angle of the shift drum 30. However, to that end, it is necessary to significantly increase the accuracy of the gear position sensor. In contrast, the twin clutch speed-change apparatus according to the present invention is characterized in that information on the rotational speed difference between the inner main shaft and the outer main shaft is used to detect the state of the dog clutch by means of the gear position sensor 134 having the same accuracy as the conventional one.

Figure 12:
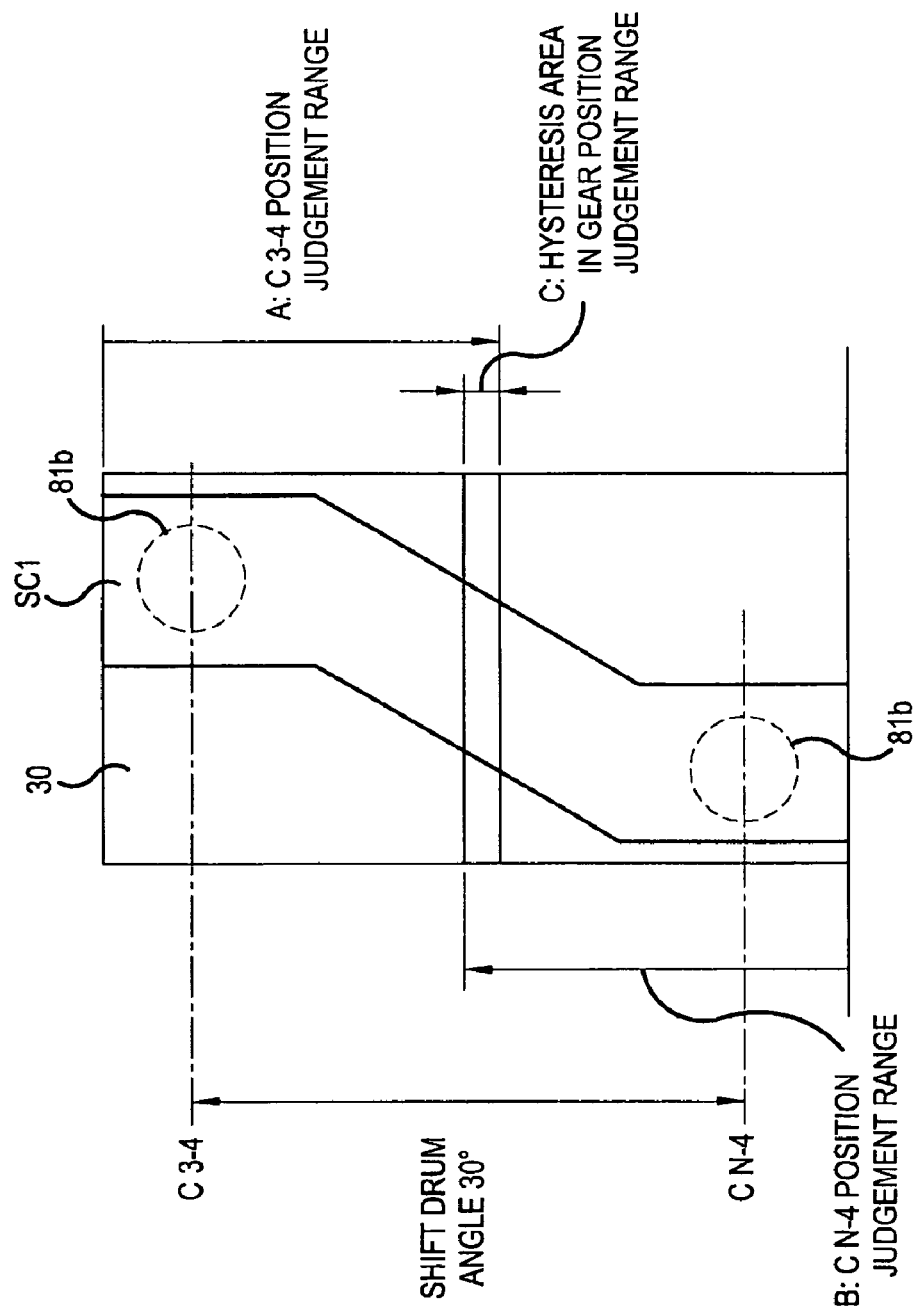
FIG. 12 is a partial enlarged schematic diagram of the shift drum, illustrating a gear position judgment range.

With reference to FIG. 12 of a partially enlarged diagram of the shift drum, the gear position sensor 134 according to the present embodiment is constructed to detect predetermined turning positions ("C 3-4" and "C N-4" in FIG. 12) of the shift drum located at 30° intervals. An angle judged to lie at each predetermined turning position is set at approximately 32° including a hysteresis area. This means that if the shift drum 30 lies at the middle of the predetermined turning positions, the gear position sensor 134 does not have such accuracy as to precisely detect that position.

Figure 6:
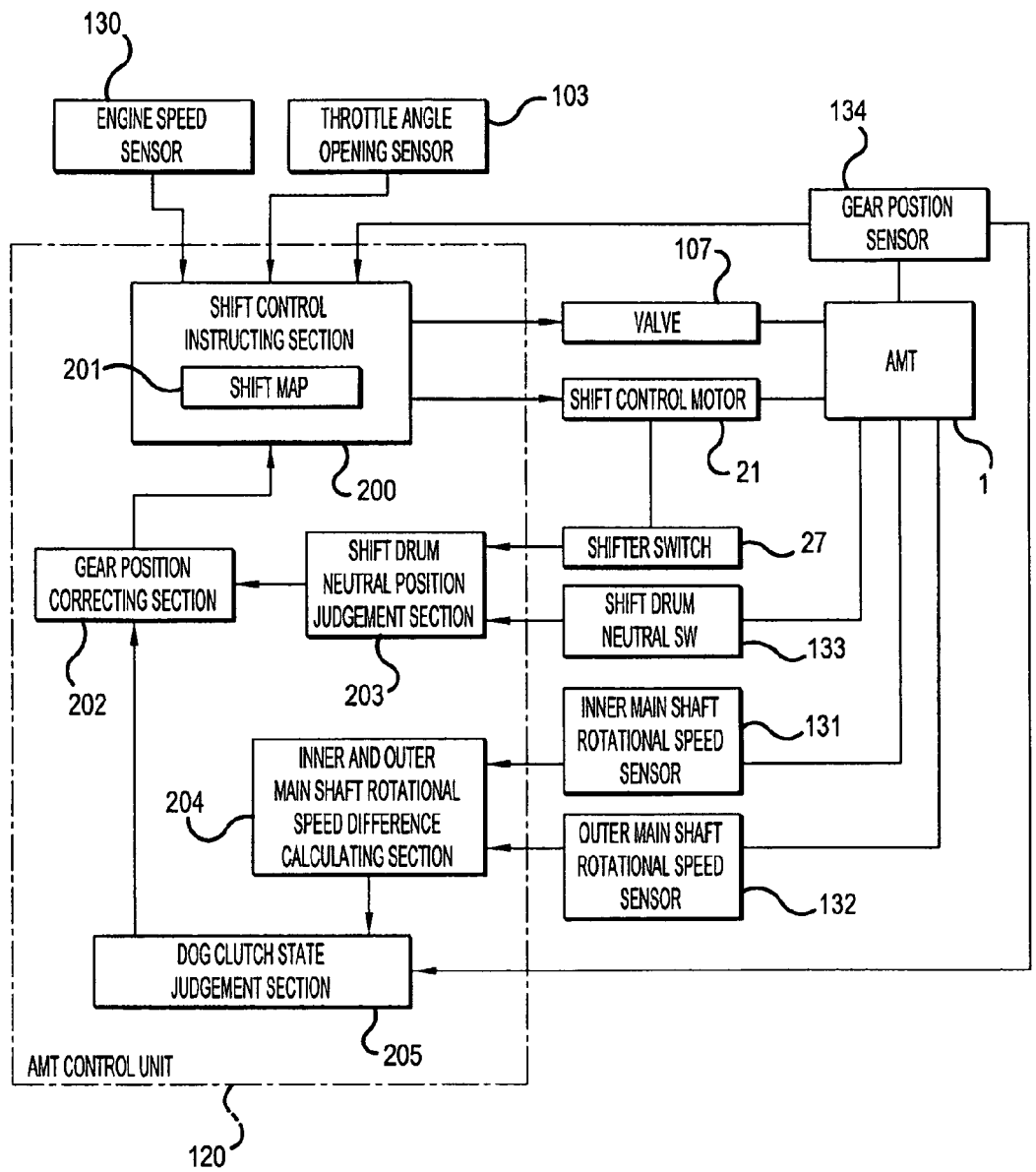
FIG. 6 is a block diagram illustrating the configuration of peripheral devices of the twin clutch type speed-change apparatus.

FIG. 6 is a block diagram illustrating the configuration of the peripheral devices of the twin clutch speed-change apparatus. The same reference numerals as those in the above description denote like or corresponding parts. The AMT control unit 120 includes a shift control instructing section 200 in which a shift map 201 is stored; a dog clutch state judging section 205; an inner and outer main shaft rotational speed difference calculating section 204; a gear position correcting section 202; and a shift drum neutral position judging section 203. The shift control instructing section 200 executes shifting operation during normal traveling by driving the shift control motor 21 and the valve 107 according to the shift map 201 comprising a three-dimensional map on the basis of the signals outputted from the engine speed sensor 130, from the throttle opening angle sensor 103 and from the gear position sensor 134 and of the vehicle speed information.

The inner and outer main shaft rotational speed difference calculating section 204 calculates the rotational speed difference between the inner main shaft 7 and the outer main shaft 6 on the basis of the signals outputted from the inner main shaft rotational speed sensor 131 and from the outer main shaft rotational speed sensor 132. The dog clutch state judging section 205 judges the state of the dog clutch on the basis of information from the inner and outer main shaft rotational speed difference calculating section 204 and from the gear position sensor 134. The gear position correcting section 202 has the following function: If the dog clutch state judging section 205 detects that the dog clutch lies in the "the dog-tip caught state" or in the "dog-tip abutting state", the dog clutch is corrected to be brought into the normal engagement or engagement-release state by allowing the shift control instructing section 200 to drive the valve 107 and the shift control motor 21. The shift drum neutral position judging section 203 judges whether or not the transmission TM certainly lies in the neutral state on the basis of information from the shifter switch 27, from the shift drum neutral switch 133, and from the gear position sensor 134.

A description is hereinafter given of the four modes of the dog clutch that may probably occurs during shifting by taking the dog teeth 55 of the sixth-speed driven gear C6 and the dog apertures 35 of the second-speed driven gear C2 as one example.

Figure 7A:
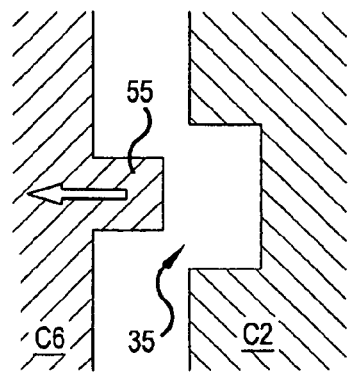
FIGS. 7(a) and 7(b) include schematic views illustrating states encountered when the engagement of a dog clutch is released.
Figure 7B:
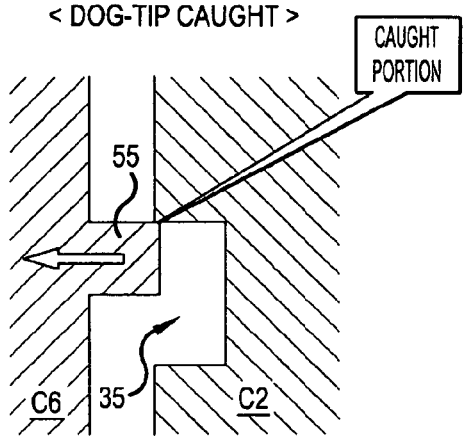

FIGS. 7(a) and 7(b) include schematic views illustrating the engagement-released state 7(a) and the dog-tip caught state 7(b) encountered when the engagement of the dog clutch is to be released. To release the engagement of the dog clutch between the driven gears C2, C6, if the shift drum 30 is turned to the predetermined turning position as shown in FIG. 7(a), the sixth-speed driven gear C6 is slid to the left to the predetermined position to complete the release of the engagement. In contrast, the dog tooth 55 is caught by a lateral wall of the dog aperture 35 so that the sixth-speed driven gear C6 cannot be slid to the predetermined position, which is "the dog-tip caught" state.

Figure 8A:
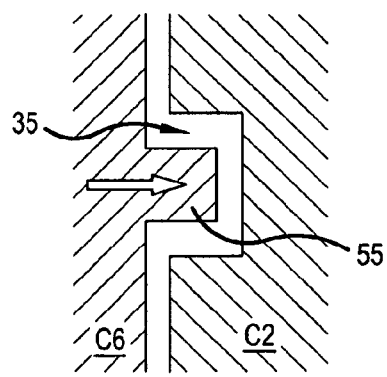
FIGS. 8(a) and 8(b) include schematic views illustrating states encountered when the dog clutch is engaged.
Figure 8B:
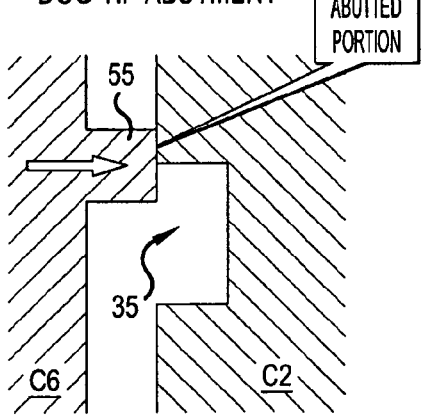

FIGS. 8(a) and 8(b) include a schematic view illustrating the engagement-completed state 8(a) and the dog-tip abutting state encountered when the dog clutch is to be engaged. To engage the dog clutch between C2 and C6, if the shift drum 30 is turned to the predetermined turning position, as shown in FIG. 8(a), the sixth-speed driven gear C6 is slid to the right to the predetermined position in FIG. 8(a) to complete the engagement. In contrast, the dog tooth 55 is not inserted into the dog aperture 35 but abutted against a lateral surface so that the sixth-speed driven gear cannot be slid to the predetermined position, which is "the dog-tip abutting" state.

FIG. 9 is a table illustrating judging conditions for the engagement state of the dog clutch. A judgment of engagement-release is first described. In a release-completed state (a) shown in FIG. 7, a signal outputted from the gear position sensor 134 provides a target gear step after shifting. The rotational speed difference between the inner and outer main shafts is zero because the engagement of the dog clutch is released. This is because of the following. For example, at the time of preliminary upshifting from the third-speed to the fourth-speed, the dog clutch between the driven gears C6, C2 may be released. In such a case, the rotational drive force that has been transmitted through the inner main shaft 7, the third-speed drive gear M3, the third-speed driven gear C3, the fifth-speed driven gear C5 and the counter shaft 9 in this order is not transmitted to the second-speed driven gear C2. Thus, the outer main shaft 6 formed with the second-speed drive gear M2 is started to be rotated (co-rotated) simultaneously with the inner main shaft 7 due to the viscosity of the lubricating oil filled between the inner main shaft 7 and the outer main shaft 6.

On the other hand, in the dog-tip caught state shown in FIG. 7, the gear position sensor signal provides a target gear step or a before-shifting gear step. This is because the turning position of the shift drum 30 depends on the position where the dog tooth 55 is caught so that it cannot be slid. The rotational speed difference between the inner and outer main shafts provides a ratio difference between before and after shifting (the transmission gear ratio difference between the second-speed and the third-speed in the embodiment) because the engagement of the dog clutch is not released so as to continuously transmit the rotational drive force to the second-speed driven gear C2.

A judgment as to the engagement of the dog clutch is next described. In the engagement-completed state shown in FIG. 8(a), a signal outputted from the gear position sensor 134 provides a target gear step after shifting. The rotational speed difference between the inner and outer main shafts provides a ratio difference before and after shifting because of the engaged dog clutch. This is because of the following. For example, at the time of preliminary upshifting from the first-speed to the second-speed, if the dog clutch between C6 and C2 is engaged, the rotational drive force is transmitted to the second-speed driven gear C2 through the inner main shaft 7, the first-speed drive gear M1, the first-speed driven gear C1, the counter shaft 9 and the sixth-speed driven gear C6 in this order. Thus, the ratio difference (the transmission gear ratio difference between the first-speed and the second-speed in this embodiment) between before and after shifting is created between the inner main shaft 7 and the outer main shaft 6.

On the other hand, in the dog-tip abutting state shown in FIG. 8(b), the gear position sensor signal provides a before-shifting gear step. This is because the dog tooth 55 is abutted against the lateral wall of the second-speed driven gear C2 so that it will not reach the range of a gear position judgment made by the gear position sensor 134 after shifting. For the rotational speed difference between the inner and outer main shafts, the dog tooth 55 is strongly abutted against the lateral wall of the second-speed driven gear C2 to generate a sufficient fictional force between the second-speed driven gear C2 and the dog tooth 55. The driven gears C2, C5 have the same rotational speed. Thus, the ratio difference between before and after shifting (the transmission gear ratio difference between the first-speed and the second-speed in the embodiment) occurs between the inner and outer main shafts. If the driven gears C2, C5 are turned while sliding with the dog teeth 55 not inserted into the corresponding dog aperture 35, the ratio difference smaller than the ratio difference between before and after shifting.

A description will hereinafter be given of a flow of dog clutch judgment processing in the twin clutch type speed-change apparatus according to the present invention with reference to FIGS. 10 and 11.

Figure 10:
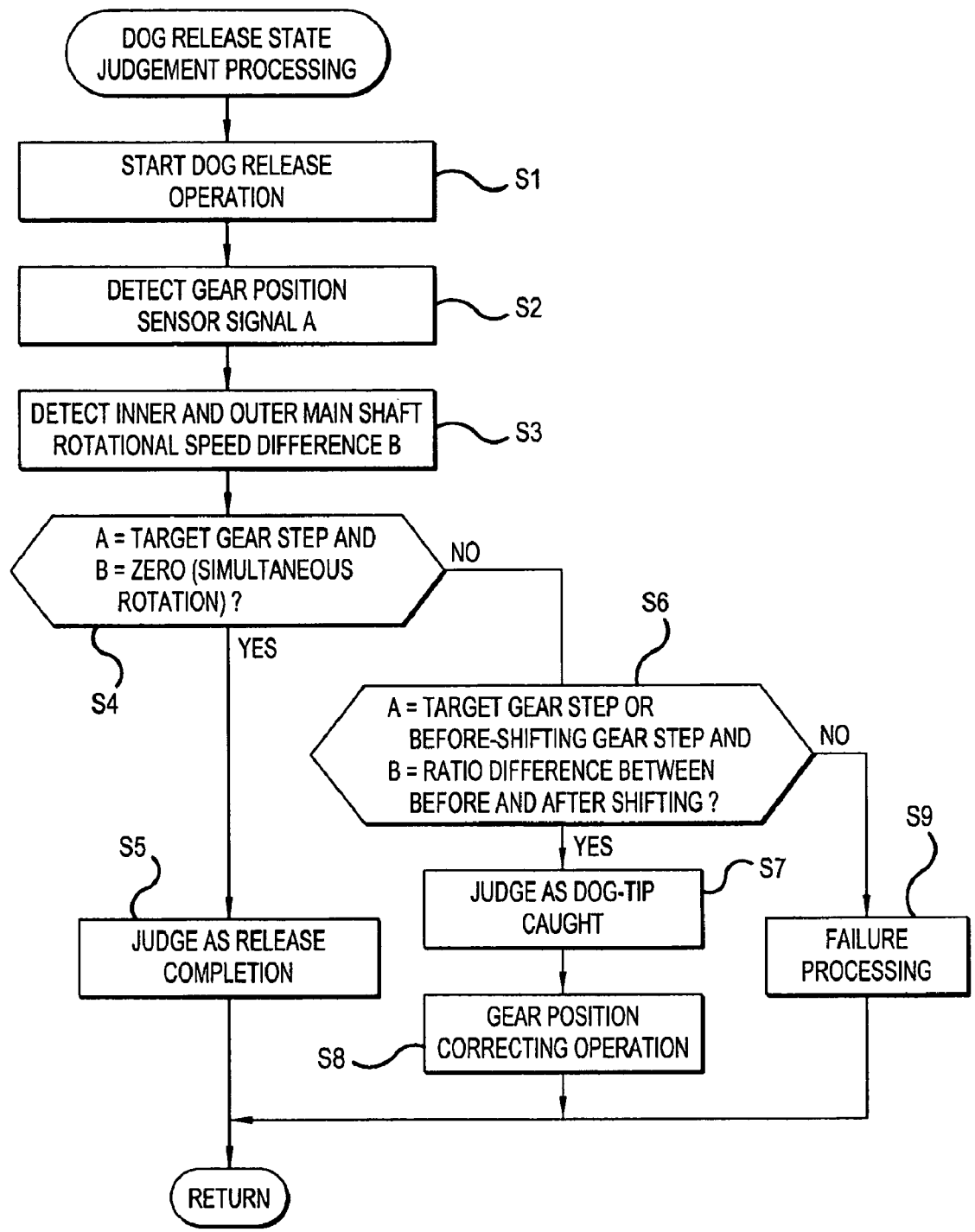
FIG. 10 is a flowchart illustrating the flow of dog-released state judging processing.

FIG. 10 is a flowchart illustrating a flow of dog release state judgment processing executed when the engagement of the dog clutch is to be released. Dog release operation is started in step S1 and then a signal "A" outputted from the gear position sensor 134 is detected in step S2. Subsequently, a rotational speed difference B between the inner and outer main shafts is derived by the inner and outer main shaft rotational speed difference calculating section 204 (see FIG. 6) in step S3. A judgment is made as to whether or not "A" is a target gear step and "B" is zero in step S4. If judged to be affirmative, processing proceeds to step S5. In step S5, a judgment is made by the dog clutch state judgment section 205 to complete the engagement release of the dog clutch. Thus, a sequence of control is ended.

If a judgment is made to be negative in step S4, processing proceeds to step S6. In step S6, a judgment is made as to whether or not "A" is a target gear step or a before-shifting gear step and "B" is a ratio difference between before and after shifting. If the judgment is made to be affirmative in step 6, a judgment is made by the dog clutch state judgment section 205 to be in the dog-tip caught state in step 7. Then, processing proceeds to step S8, in which gear position correcting operation is executed. This gear position correcting operation is set so that it is executed by the gear position correcting section 202 to repeatedly perform engagement/disengagement operation on the first clutch CL1 or second clutch CL2, thereby eliminating the dog-tip caught state. In addition, if a judgment is made to be negative in step S6, processing proceeds to step S9, in which failure processing for checking the function or the like of each sensor is executed because such a state does not occur if each sensor normally operates. Thus, a sequence of control is ended.

In the twin clutch type speed-change apparatus according to the present invention, the shift drum 30 is provided with the lost motion mechanism 140. Therefore, there is a possibility that after the judgment is made to be negative in step S4, the lost motion mechanism 140 is operated to complete the engagement release of the dog clutch. For this reason, after the judgment is made to be negative in step S4, the judgment of step 6 may be executed after the lapse of a predetermined time during which the operation of the lost motion mechanism 140 is anticipated.

Figure 11:
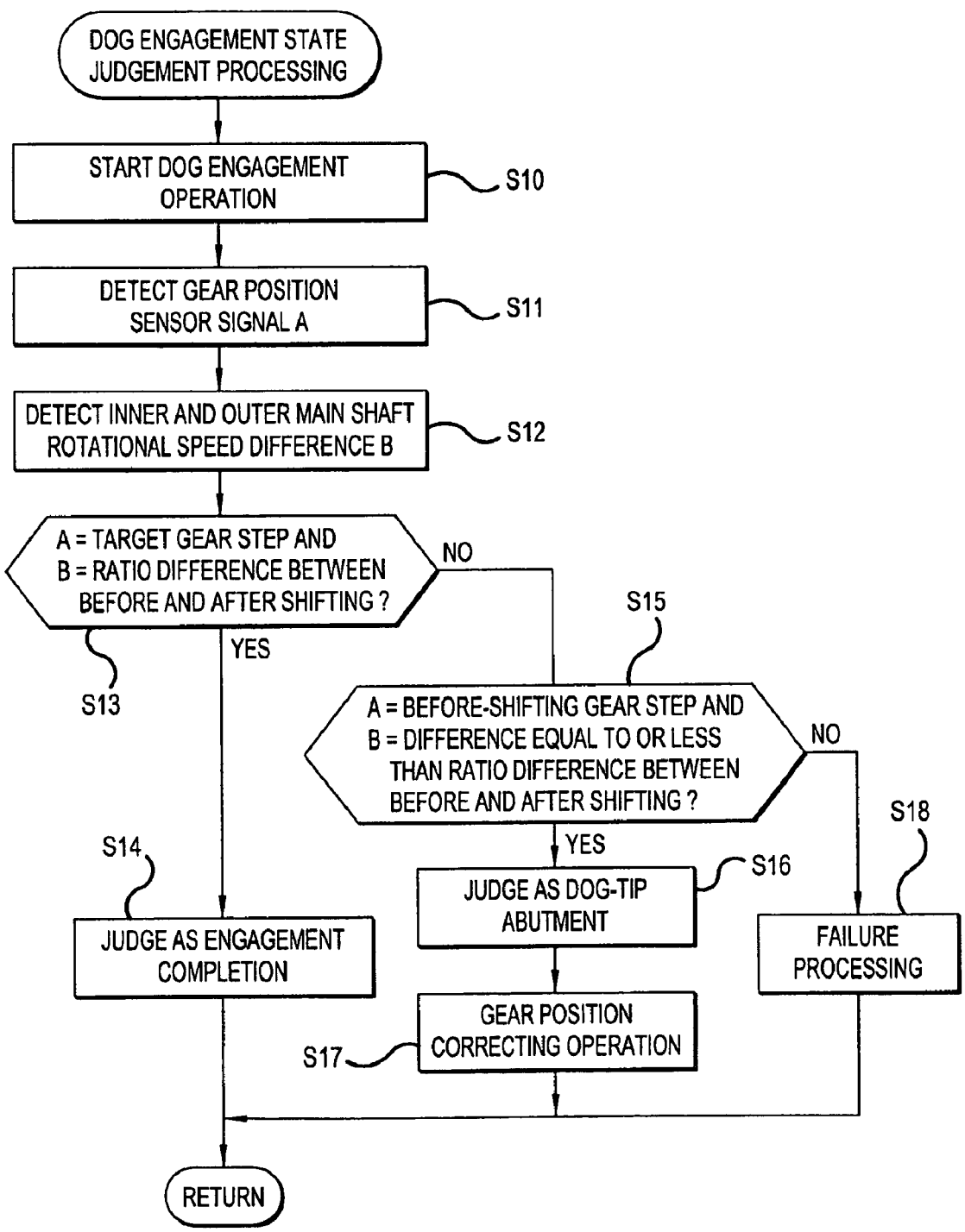
FIG. 11 is a flowchart illustrating the flow of dog engagement state judging processing.

FIG. 11 is a flowchart illustrating a flow of dog engagement state judgment processing executed when the dog clutch is to be engaged. Dog engagement operation is started in step S10 and then a signal "A" outputted from the gear position sensor 134 is detected in step S11. Subsequently, a rotational speed difference "B" between the inner and outer main shafts is detected in step S12. In step S13, a judgment is made as whether or not "A" is a target gear step and "B" is a ratio difference between before and after shifting. If a judgment is made to be affirmative, processing proceeds to step S14. In step S14, a judgment is made by the dog clutch state judgment section 205 to complete the engagement of the dog clutch. Thus, a sequence of control operation is ended.

If the judgment is made to be negative in step S13, processing proceeds to step S15. In step S15, a judgment is made as to whether or not "A" is a before-shifting gear step and "B" is equal to or smaller than a ratio difference between before and after shifting. If a judgment is made to be affirmative in step S15, a judgment is made in step S16 by the dog clutch state judgment section 205 to be in the dog-tip abutting state and processing proceeds to step S17. In step S17, gear position correcting operation is executed. As with the dog release state judgment processing, also the gear position correcting operation eliminates the dog-tip abutment state by repeatedly performing the engagement/disengagement operation on the first clutch CL1 or on the second clutch CL2. In addition, if a judgment is made to be negative in step S15, processing proceeds to step S18, in which failure processing for checking the function or the like of each sensor is executed. Thus, a sequence of control is ended.

In addition, the failure processing executed in each of steps S9 and S18 can execute various operations. For example, while checking the functions of the sensors, a warning lamp provided in a vehicle instrument may warn an occupant of the abnormality of the transmission. When the engine speed lowers to near-idling speed, the twin clutch may be switched into the disengagement state. Alternatively, the shift drum may automatically be turned to a neutral position or other processing may be executed. Thus, it is possible to prevent the occurrence of drive power transmission against the occupant's intension. In addition, the judgment made as to whether or not the shift drum 30 is returned to a neutral position makes it a condition that all signals outputted from the shift switch 27, from the shift drum neutral switch 133 and from the gear position sensor 134 indicate a neutral position, in order to increase reliability.

As described above, the twin clutch type speed-change apparatus includes the inner main shaft rotational speed sensor for detecting the rotational speed of the inner main shaft and the outer main shaft rotational speed sensor for detecting the rotational speed of the outer main shaft and uses the rotational speed difference between the inner and outer main shafts to judge the engagement state of the dog clutch. Thus, the engagement state of the dog clutch can accurately be detected without increasing the detection accuracy of the gear position sensor.

The configuration of the twin clutch type speed-change apparatus, the shapes of the dog tooth and dog aperture of the dog clutch, the number of the gear steps of the transmission, the configuration of the ATM control unit, the configuration of the rotational speed sensors for the inner and outer main shafts, the detection accuracy of the gear position sensor, etc. are not limited to the embodiment described above but can be modified in various ways. For example, time for waiting for the end of the operation of the lost motion mechanism may optionally be set. The speed-change gears of the transmission may include a reverse step.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin clutch type speed-change apparatus comprising:
   a transmission having a plurality of gear pairs between a main shaft and a counter shaft; and
   a twin clutch provided on the main shaft, the twin clutch being adapted to connect or disconnect a rotational drive force of an engine between the engine and the transmission;
   said main shaft being composed of an inner main shaft and an outer main shaft rotatably supporting the inner main shaft,
   said twin clutch being composed of a first clutch adapted to connect or disconnect the rotational drive force transmitted to the inner main shaft and a second clutch adapted to connect or disconnect the rotational drive force transmitted to the outer main shaft,
   said transmission is configured to execute transmission of the rotational drive force between speed-change gears adjacent to each other on each of the shafts by means of a dog clutch composed of a dog tooth and a dog aperture; and
   wherein the speed-change apparatus includes:
   a gear position sensor for detecting a speed-change step number of the transmission on the basis of a turning position of a shift drum;
   an inner main shaft rotational speed sensor for detecting a rotational speed of the inner main shaft;
   an outer main shaft rotational speed sensor for detecting a rotational speed of an outer main shaft; and
   a control unit for shift-controlling the transmission;
   wherein the control unit detects an engagement state of the dog clutch on the basis of a rotational speed difference between the inner main shaft and the outer main shaft and of information on the speed step number.

2. The twin clutch type speed-change apparatus according to claim 1, wherein
   the inner main shaft rotational speed sensor detects a rotational speed of a speed-change gear attached to the counter shaft so as to be rotatable and not-slidable with respect thereto and meshed with a speed-change gear attached to the inner main shaft so as not to rotatable with respect thereto, and
   the outer main shaft rotational speed sensor detects a rotational speed of a speed-change gear attached to the counter shaft so as to be rotatable and not-slidable with respect thereto and meshed with a speed-change gear attached to the outer main shaft so as not to be rotatable with respect thereto.

3. The twin clutch type speed-change apparatus according to claim 1, wherein
   the control unit, when engagement of the dog clutch is to be released, judges that the release of the engagement is normally completed if a signal outputted from the gear position sensor indicates a speed step number after shifting and the rotational speed difference is zero, and judges that the dog clutch is in a dog-tip caught state where the dog tooth is not drawn from the dog aperture if a signal outputted from the gear position sensor indicates a speed step number before or after shifting and the rotational speed difference is a transmission gear ratio difference between before and after shifting, and
   on the other hand, the control unit, when the dog clutch is to be engaged, judges that the engagement is normally completed if a signal outputted from the gear position sensor indicates a speed step number after shifting and the rotational speed difference is a transmission gear ratio difference between before and after shifting, and judges that the dog clutch is in a dog-tip abutting state where the dog tooth is not inserted into the dog aperture if a signal outputted from the gear position sensor indicates a speed step number before shifting and the rotational speed difference is equal to or less than a transmission gear ratio difference between before and after shifting.

4. The twin clutch type speed-change apparatus according to claim 2, wherein the control unit, when engagement of the dog clutch is to be released, judges that the release of the engagement is normally completed if a signal outputted from the gear position sensor indicates a speed step number after shifting and the rotational speed difference is zero, and judges that the dog clutch is in a dog-tip caught state where the dog tooth is not drawn from the dog aperture if a signal outputted from the gear position sensor indicates a speed step number before or after shifting and the rotational speed difference is a transmission gear ratio difference between before and after shifting, and on the other hand, the control unit, when the dog clutch is to be engaged, judges that the engagement is normally completed if a signal outputted from the gear position sensor indicates a speed step number after shifting and the rotational speed difference is a transmission gear ratio difference between before and after shifting, and judges that the dog clutch is in a dog-tip abutting state where the dog tooth is not inserted into the dog aperture if a signal outputted from the gear position sensor indicates a speed step number before shifting and the rotational speed difference is equal to or less than a transmission gear ratio difference between before and after shifting.

5. The twin clutch type speed-change apparatus according to claim 1, wherein the gear pair is composed of a slidable gear axially slidably attached to select a gear pair adapted to transmit a rotational drive force to the counter shaft and an axially non-slidably attached non-slidable gear, wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto, wherein the transmission is configured to be shiftable to an adjacent speed step by switching the engagement state of the twin clutch when the slidable gear is located at a predetermined position, and wherein the dog clutch is disposed between the slidable gear and the non-slidable gear coaxially adjacent to the slidable gear.

6. The twin clutch type speed-change apparatus according to claim 2, wherein the gear pair is composed of a slidable gear axially slidably attached to select a gear pair adapted to transmit a rotational drive force to the counter shaft and an axially non-slidably attached non-slidable gear, wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto, wherein the transmission is configured to be shiftable to an adjacent speed step by switching the engagement state of the twin clutch when the slidable gear is located at a predetermined position, and wherein the dog clutch is disposed between the slidable gear and the non-slidable gear coaxially adjacent to the slidable gear.

7. The twin clutch type speed-change apparatus according to claim 3, wherein the gear pair is composed of a slidable gear axially slidably attached to select a gear pair adapted to transmit a rotational drive force to the counter shaft and an axially non-slidably attached non-slidable gear, wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto, wherein the transmission is configured to be shiftable to an adjacent speed step by switching the engagement state of the twin clutch when the slidable gear is located at a predetermined position, and wherein the dog clutch is disposed between the slidable gear and the non-slidable gear coaxially adjacent to the slidable gear.

8. The twin clutch type speed-change apparatus according to claim 4, wherein the gear pair is composed of a slidable gear axially slidably attached to select a gear pair adapted to transmit a rotational drive force to the counter shaft and an axially non-slidably attached non-slidable gear, wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto, wherein the transmission is configured to be shiftable to an adjacent speed step by switching the engagement state of the twin clutch when the slidable gear is located at a predetermined position, and wherein the dog clutch is disposed between the slidable gear and the non-slidable gear coaxially adjacent to the slidable gear.

9. A twin clutch type speed-change apparatus comprising:

a transmission having a plurality of gear pairs between a main shaft and a counter shaft; and an inner main shaft and an outer main shaft rotatably supporting the inner main shaft, said inner main shaft and the outer main shaft forming the main shaft;

a first clutch adapted to connect or disconnect the rotational drive force transmitted to the inner main shaft;

a second clutch adapted to connect or disconnect the rotational drive force transmitted to the outer main shaft;

said transmission is configured to execute transmission of the rotational drive force between speed-change gears adjacent to each other on each of the shafts by means of a dog clutch composed of a dog tooth and a dog aperture; and said speed-change apparatus includes:

a gear position sensor for detecting a speed-change step number of the transmission on the basis of a turning position of a shift drum;

an inner main shaft rotational speed sensor for detecting a rotational speed of the inner main shaft;

an outer main shaft rotational speed sensor for detecting a rotational speed of an outer main shaft; and a control unit for shift-controlling the transmission;

wherein the control unit detects an engagement state of the dog clutch on the basis of a rotational speed difference between the inner main shaft and the outer main shaft and of information on the speed step number.

10. The twin clutch type speed-change apparatus according to claim 9, wherein
the inner main shaft rotational speed sensor detects a rotational speed of a speed-change gear attached to the counter shaft so as to be rotatable and not-slidable with respect thereto and meshed with a speed-change gear attached to the inner main shaft so as not to rotatable with respect thereto, and
the outer main shaft rotational speed sensor detects a rotational speed of a speed-change gear attached to the counter shaft so as to be rotatable and not-slidable with respect thereto and meshed with a speed-change gear attached to the outer main shaft so as not to be rotatable with respect thereto.

11. The twin clutch type speed-change apparatus according to claim 9, wherein
the control unit, when engagement of the dog clutch is to be released, judges that the release of the engagement is normally completed if a signal outputted from the gear position sensor indicates a speed step number after shifting and the rotational speed difference is zero, and judges that the dog clutch is in a dog-tip caught state where the dog tooth is not drawn from the dog aperture if a signal outputted from the gear position sensor indicates a speed step number before or after shifting and the rotational speed difference is a transmission gear ratio difference between before and after shifting, and
on the other hand, the control unit, when the dog clutch is to be engaged, judges that the engagement is normally completed if a signal outputted from the gear position sensor indicates a speed step number after shifting and the rotational speed difference is a transmission gear ratio difference between before and after shifting, and judges that the dog clutch is in a dog-tip abutting state where the dog tooth is not inserted into the dog aperture if a signal outputted from the gear position sensor indicates a speed step number before shifting and the rotational speed difference is equal to or less than a transmission gear ratio difference between before and after shifting.

12. The twin clutch type speed-change apparatus according to claim 10, wherein
the control unit, when engagement of the dog clutch is to be released, judges that the release of the engagement is normally completed if a signal outputted from the gear position sensor indicates a speed step number after shifting and the rotational speed difference is zero, and judges that the dog clutch is in a dog-tip caught state where the dog tooth is not drawn from the dog aperture if a signal outputted from the gear position sensor indicates a speed step number before or after shifting and the rotational speed difference is a transmission gear ratio difference between before and after shifting, and
on the other hand, the control unit, when the dog clutch is to be engaged, judges that the engagement is normally completed if a signal outputted from the gear position sensor indicates a speed step number after shifting and the rotational speed difference is a transmission gear ratio difference between before and after shifting, and judges that the dog clutch is in a dog-tip abutting state where the dog tooth is not inserted into the dog aperture if a signal outputted from the gear position sensor indicates a speed step number before shifting and the rotational speed difference is equal to or less than a transmission gear ratio difference between before and after shifting.

13. The twin clutch type speed-change apparatus according to claim 9,
wherein the gear pair is composed of a slidable gear axially slidably attached to select a gear pair adapted to transmit a rotational drive force to the counter shaft and an axially non-slidably attached non-slidable gear,
wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto,
wherein the transmission is configured to be shiftable to an adjacent speed step by switching the engagement state of the twin clutch when the slidable gear is located at a predetermined position, and
wherein the dog clutch is disposed between the slidable gear and the non-slidable gear coaxially adjacent to the slidable gear.

14. The twin clutch type speed-change apparatus according to claim 10,
wherein the gear pair is composed of a slidable gear axially slidably attached to select a gear pair adapted to transmit a rotational drive force to the counter shaft and an axially non-slidably attached non-slidable gear,
wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto,
wherein the transmission is configured to be shiftable to an adjacent speed step by switching the engagement state of the twin clutch when the slidable gear is located at a predetermined position, and
wherein the dog clutch is disposed between the slidable gear and the non-slidable gear coaxially adjacent to the slidable gear.

15. The twin clutch type speed-change apparatus according to claim 11,
wherein the gear pair is composed of a slidable gear axially slidably attached to select a gear pair adapted to transmit a rotational drive force to the counter shaft and an axially non-slidably attached non-slidable gear,
wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto,
wherein the transmission is configured to be shiftable to an adjacent speed step by switching the engagement state of the twin clutch when the slidable gear is located at a predetermined position, and
wherein the dog clutch is disposed between the slidable gear and the non-slidable gear coaxially adjacent to the slidable gear.

16. The twin clutch type speed-change apparatus according to claim 12,
wherein the gear pair is composed of a slidable gear axially slidably attached to select a gear pair adapted to transmit a rotational drive force to the counter shaft and an axially non-slidably attached non-slidable gear, wherein the slidable gear is provided on each of the inner main shaft, the outer main shaft and the counter shaft and is slid by a shift fork engaged with the slidable gear to connect or disconnect a rotational drive force between the slidable gear and the non-slidable gear coaxially adjacent thereto, wherein the transmission is configured to be shiftable to an adjacent speed step by switching the engagement state of the twin clutch when the slidable gear is located at a predetermined position, and wherein the dog clutch is disposed between the slidable gear and the non-slidable gear coaxially adjacent to the slidable gear.

* * * * *